UNITED STATES PATENT OFFICE.

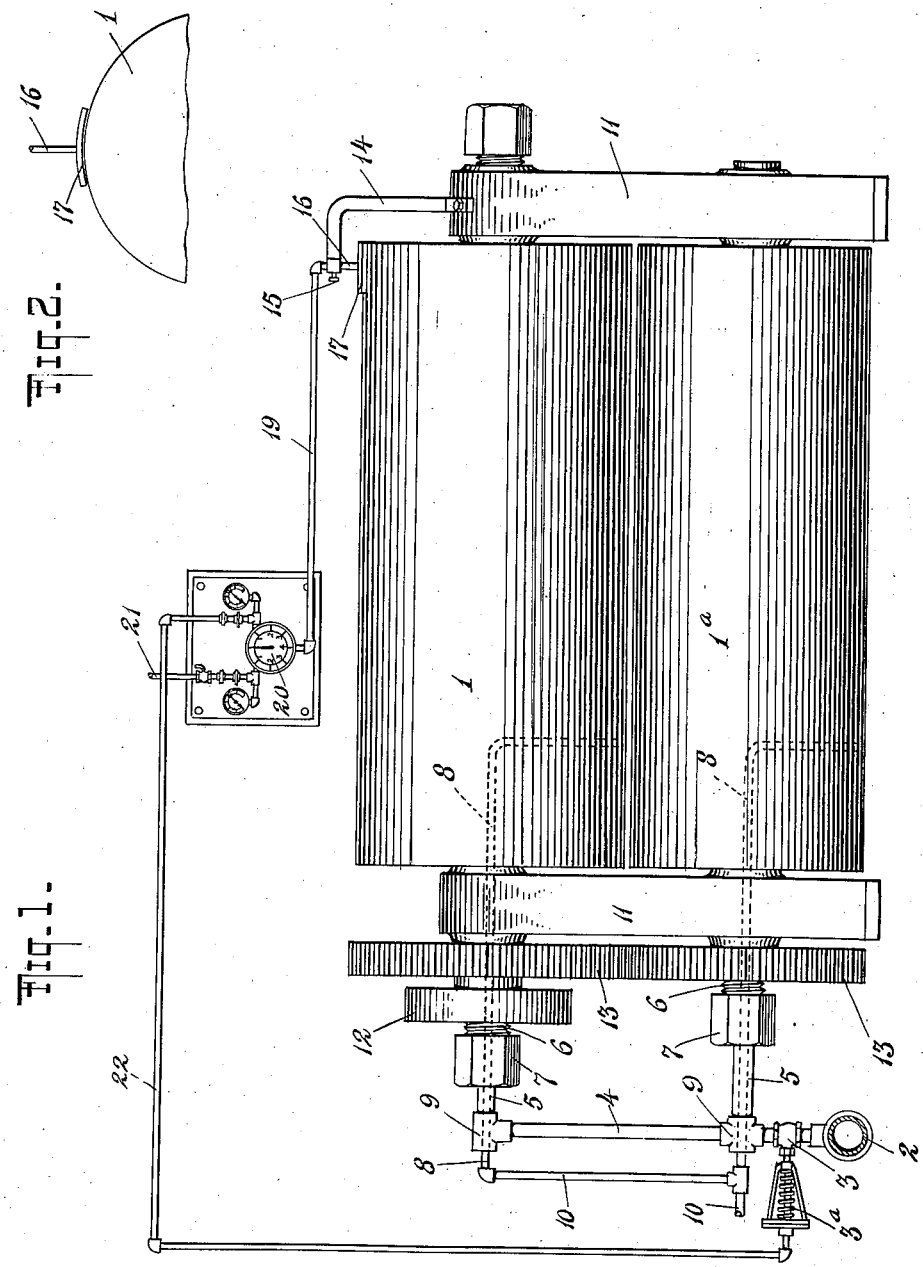

GEORGE S. WITHAM, SR., OF HUDSON FALLS, AND ALFRED ROESCH, OF BROOKLYN, NEW YORK, ASSIGNORS TO CHARLES J. TAGLIABUE MANUFACTURING CO., OF BROOKLYN, NEW YORK, A CORPORATION OF NEW YORK.

THERMOSTATIC REGULATION FOR HEATED ROLLERS.

1,167,036.     Specification of Letters Patent.     Patented Jan. 4, 1916.

Original application filed January 15, 1913, Serial No. 742,119. Divided and this application filed August 11, 1914. Serial No. 856,178.

*To all whom it may concern:*

Be it known that we, GEORGE S. WITHAM, Sr., a citizen of the United States, and resident of Hudson Falls, county of Washington, and State of New York, and ALFRED ROESCH, a citizen of the United States, and resident of Brooklyn, county of Kings, city and State of New York, have invented certain new and useful Improvements in Thermostatic Regulation for Heated Rollers, of which the following is a specification.

The form of the invention herein shown and described has been divided out of our application, Serial No. 742,119, filed January 15, 1913.

Our invention relates to the thermostatic control of calender rollers of various kinds where it is essential for the best results, to maintain the rollers at a substantially uniform temperature. The calender rollers used in the preparation of sheet rubber, gutta perchas and paper are of this character and should be maintained at a constant temperature.

In the manufacture of paper where, to properly dry the paper, it is necessary to pass it between a plurality of uniformly heated calender rollers, any failure to maintain such rollers at the required constant temperature becomes apparent by the rupture of the continuous sheet of paper or by the production of defective, moist, and unsalable stock. The result in either case is a severe loss to the manufacturer both in stock and in loss of time, when of necessity the machines must remain idle until the proper conditions are restored. Many mechanical devices have been tried in connection with the calender rollers used in paper manufacturing machines, in an attempt to obviate the difficulties and decrease the loss, but as such devices usually depend upon the condition of the product for control of the temperature of the rollers, the temperature thereof will vary widely above and below the desired temperature, thus resulting in a lack of uniformity in the product and the frequent losses above referred to.

With a view to obviating the above difficulties and as conducive to the manufacture of a uniform product, the object of our invention is to regulate the temperature of the rollers by direct means depending upon the actual temperature of the roller. Since this control is entirely independent of the condition of the product and the temperature of the rollers is maintained substantially constant the paper will be turned out practically uniform and without defects, and there will be no loss from breakdown or defective material.

We have found that the temperature of two or more rollers may be regulated satisfactorily by a simple sensitive member placed in position to be affected by the temperature of one of the rollers which will thus control the steam flow to the two or more rollers. Such an arrangement is illustrated in the accompanying drawings in which—

Figure 1 hows two calender rollers controlled by a sensitive member associated with one of them, and Fig. 2 is an end view of a part of the upper roller with the sensitive member in contact therewith.

In the drawings 1 represents a revoluble calender roller of the character usually employed in the manufacture of paper. Two series (1, 1$^a$) of such rollers are embodied in a complete machine, one series being above the other, the continuous sheet of paper being dried by passing it between the rollers. The rollers are heated, and to properly dry the paper should be maintained at a predetermined constant temperature. In the present instance the rollers are adapted to be heated by steam from a main steam pipe 2, which by a suitable coupling is connected with the valve 3 which is adapted to regulate the admission of steam to two rollers, one above the other as indicated. Steam passing the valve 3 enters the pipe 4 and from there by branch pipes 5 enters the rollers 1, 1$^a$ axially through the tubular trunnions of the respective rollers. The end of the trunnion 6 is screw-threaded to receive the usual hollow stuffing-box nut 7 which renders the joint between the pipe 5 and the trunnion 6, steam tight but permits rotation of the roller. The pipe 5 is of sufficiently large diameter to admit the necessary steam about a smaller return pipe 8, indicated in dotted lines as passing into the roller and terminating near the inner bottom surface of the roller thereby permitting the steam to circulate and the condensed water to escape.

The pipes 8 are secured in place by special couplings 9 through which they pass and are connected with a common return pipe 10, in the usual manner. The rollers are suitably mounted to rotate in bearing blocks 11 and may be rotated in any suitable manner as, for instance, a pulley 12 may be secured to the trunnion 6 and adapted to drive the roller 1 which in turn will drive the roller 1ª by means of the intermeshing gears 13.

The problem heretofore has been to properly control the flow of steam so as to maintain the rollers at the constant temperature required for proper drying of the paper. For this purpose our invention contemplates the thermostatic control of the temperature of the revoluble rollers. Any suitable thermostatic controlling device may be employed but the type of device here shown is similar in structure and operation to that shown and described in Letters Patent No. 920,883 of May 4, 1909, to W. J. Ruff. In the form of the invention shown a bracket or support 14 of suitable shape is secured to the right hand bearing block 11, as seen in Fig. 1 of the drawings. This bracket preferably extends upward and over the top of the calender roller 1 and at 15 is adapted to support a tube 16 provided at its lower end with a bulb or sensitive member 17 preferably made in the shape of a segment of a cylinder to conform to the curvature of the surface of the roller. (See Fig. 2.) By this arrangement the sensitive bulb is held in a fixed position while the roller 1 revolves past it, and is preferably adjusted so as to be in close proximity to the surface of the roller or substantially in contact therewith, in which position it is adapted to be affected by the temperature thereof. The sensitive member may be filled with ether or other volatile fluid sensitive to heat, the expansion of the vapor of which through an extension 19 of the tubular stem 16 is adapted to control the usual air pressure controlling device such as shown in the Ruff patent above identified. A complete description of this device, which is well known in the art, is considered unnecessary. The dial 20 is intended to enable the device to be set at the predetermined temperature required for the roller 1. It will be understood that when the temperature rises above the normal, the sensitive member 17 will be accordingly affected and through the pipe 16, 19, is adapted to admit compressed air from the pipe 21 into the pipe 22. The pipe 22 communicates with the usual diaphragm cell on the end of the valve stem of the steam valve 3 thereby permitting the valve to be closed by air pressure. If the temperature of the roller drops below the normal the sensitive member 17 will cause the compressed air to be cut off and the air in the pipe 22 to exhaust as the valve 3 is lifted by the usual spring 3ª, thereby turning the steam into the rollers which will soon restore the temperature to normal. Thus while the rollers are permitted to rotate in the usual manner the temperature thereof will be maintained substantially constant, as required.

Various modifications of the specific details may be made without departing from the spirit and scope of the claims.

We claim:

1. In a device for the purpose specified a revoluble calender roller, means for heating the same, a sensitive thermostatic member adapted to be affected by the temperature of said roller, means for supporting said sensitive member at or near the surface of said roller, said support being adapted to prevent rotation of the sensitive member with said roller, and means controlled by said sensitive member for controlling the flow of heat to said roller.

2. In a device for the purpose specified a revoluble calender roller, supports therefor, means for heating said roller, a sensitive thermostatic member adapted to be affected by the temperature of said roller, means connected with said supports for supporting said sensitive member at or near the surfaces of said roller, and for preventing the rotation thereof with said roller, and means controlled by said sensitive member for controlling the flow of heat to said roller.

3. In a device for the purpose specified a revoluble calender roller, means for heating the same with a fluid, a sensitive thermostatic member in a fixed position substantially in contact with the surface of said roller and adapted to be affected by the temperature thereof and means controlled by said sensitive member for controlling the flow of heating fluid to said roller whereby the roller is maintained at a uniform temperature.

4. In a device for the purpose specified a revoluble calender roller, means for heating the same with a fluid, a sensitive thermostatic member adapted to be affected by the temperature of the roller, means for supporting said sensitive member in a fixed position adjacent to the surface of said roller and means controlled by said sensitive member for controlling the flow of heating fluid to said roller whereby the roller is maintained at a uniform temperature.

5. In a device for the purpose specified, a revoluble calender roller, bearing blocks therefor, means for heating said roller with a fluid, a sensitive thermostatic member adjacent to and adapted to be affected by the temperature of the roller at its surface, means secured to one of said bearing blocks for supporting said sensitive member in position to be affected by the surface temperature of the roller and adapted to prevent rotation thereof with the roller and means controlled by said sensitive member for controlling the flow of heating fluid to said roller, whereby the roller is maintained at a uniform temperature.

In testimony whereof we have hereunto set our hands in the presence of two subscribing witnesses.

GEORGE S. WITHAM, Sr.
   ALFRED ROESCH.

Witnesses for Witham:
 E. B. WILLIAMS,
 G. G. DURANT, Jr.
Witnesses for Roesch:
 M. H. LOCKWOOD,
 FRED A. KLEIN.